United States Patent [19]

Bernacchi et al.

[11] Patent Number: 4,764,386

[45] Date of Patent: Aug. 16, 1988

[54] PROCESS FOR PREPARING STORAGE STABLE, READILY RECONSTITUTED FROZEN COMESTIBLES

[75] Inventors: Donald B. Bernacchi; Robert J. Loewe, both of Chicago; Donna L. Immel, Downers Grove, all of Ill.

[73] Assignee: Griffith Laboratories U.S.A., Inc., Alsip, Ill.

[21] Appl. No.: 941,690

[22] Filed: Dec. 15, 1986

Related U.S. Application Data

[63] Continuation of Ser. No. 779,657, Sep. 24, 1985.

[51] Int. Cl.⁴ ............................................. A23P 1/08
[52] U.S. Cl. ................................ 426/293; 426/303; 426/89
[58] Field of Search ............ 426/89, 96, 95, 100, 426/237, 238, 293, 302, 289, 273, 244, 555, 303, 291, 292, 119, 128, 94, 295, 296, 106, 108

[56] References Cited

U.S. PATENT DOCUMENTS

| | | | |
|---|---|---|---|
| 2,623,825 | 6/1953 | Tressler et al. | 99/94 |
| 3,078,172 | 2/1963 | Libby | 99/192 |
| 3,169,069 | 2/1965 | Hanson et al. | 99/194 |
| 3,586,512 | 6/1971 | Mancuso | 99/100 |
| 3,656,969 | 4/1972 | Horn | 99/100 |
| 3,676,158 | 7/1972 | Fischer | 99/166 |
| 3,843,827 | 10/1974 | Lee et al. | 426/293 |
| 3,976,798 | 8/1976 | Young et al. | 426/291 |
| 4,068,009 | 1/1978 | Rispoli et al. | 426/291 |
| 4,199,603 | 4/1980 | Sortwell | 426/92 |
| 4,272,553 | 6/1981 | Bengtsson et al. | 426/241 |
| 4,423,078 | 12/1983 | Darley et al. | 426/549 |
| 4,499,113 | 2/1985 | Mochezuki et al. | 426/293 |
| 4,504,502 | 3/1985 | Earle et al. | 426/293 |
| 4,518,618 | 5/1985 | Hsia et al. | 426/262 |
| 4,529,607 | 7/1985 | Lenchin et al. | 426/94 |
| 4,595,597 | 6/1986 | Lenchin et al. | 426/555 |

FOREIGN PATENT DOCUMENTS

109226 5/1984 European Pat. Off. .
57159451 12/1985 Japan .

OTHER PUBLICATIONS

Tracy's Complete Chicken Cookery 1953; Bobbs-Merril, pages 113, 119, 122 and 123.
Bourque 1978 Country Kettle Microwave Cookbook, Cookbook Publishers, Inc., Lenexa Kan.

Primary Examiner—Donald E. Czaja
Assistant Examiner—Carolyn Paden
Attorney, Agent, or Firm—Hosier & Sufrin, Ltd.

[57] ABSTRACT

A method is disclosed for preparing coated, frozen comestibles which are stable when stored for extended periods and which, when reconstituted by microwave heating, have a texture and appearance organoleptically equivalent or superior to that of fat fried coated comestibles. According to the method, the comestibles are enrobed with a first coating of a batter including wheat flour and shortening, placed in a heated water bath for up to sixty seconds, fried, given a second coating, fried a second time and frozen.

18 Claims, No Drawings

PROCESS FOR PREPARING STORAGE STABLE, READILY RECONSTITUTED FROZEN COMESTIBLES

This is a continuation-in-part of U.S. patent application Ser. No. 779,657, filed Sept. 24, 1985.

BACKGROUND OF THE INVENTION

This invention relates generally to coated frozen comestibles. More particularly, this invention relates to a process for the preparation of batter coated and breaded frozen comestibles which can be reconstituted by microwave heating or by baking in a conventional oven, and which exhibit good storage stability. This invention relates as well, to the frozen comestibles produced by the described and claimed process.

Batter coated and breaded frozen comestibles are widely used, both in large scale food preparation operations, such as are found in restaurants and public institutions, and on a smaller scale, in the preparation of meals in the home. Frozen comestibles generally are popular due to their storage stability, relative ease of reconstitution and economy.

Frozen comestibles typically have a high water content and release a substantial amount of free water when they are heated. When conventional batter coated and breaded frozen comestibles such as poultry, fish, red meats, and vegetables are subjected to microwave heating or to baking in a conventional oven, the released free water saturates the coating, making it non-adherent, mushy, pasty in flavor, and generally organoleptically undesirable. This problem is aggravated in conventional batter coated and breaded frozen comestibles which are subjected to repeated freeze-thaw cycles during storage. In order to obtain a crisp, brown continuous outer coating on the surface of such products, it has heretofore been necessary to reconstitute the batter coated and breaded comestibles only by frying, which produces high cooking temperatures that drive off the free water.

If batter coated and breaded frozen comestibles could be made in a way which permitted not only reconstitution by microwave heating or by baking in a conventional oven, but also permitted extended storage, an important contribution to the art would be at hand. Such products would be well received in the marketplace both due to their storage characteristics and because, when reconstituted, they would be healthier and more economical than prior such products reconstituted by frying, which requires the addition of expensive, high calorie fats and oils. Furthermore, the product would be more convenient to use than currently available frozen comestibles since reconstitution by microwave heating can be accomplished far more rapidly than reconstitution by frying or by any other presently known method.

It has been suggested that batter coated and breaded frozen comestibles including poultry, fish, red meats and vegetables be subjected to a pre-frying step prior to packaging to partially cook the coating, thereby improving the end product obtained by microwave heating or conventional oven baking. Unfortunately, even this pre-frying step is insufficient to make possible the desired product because presently known batter and breaded coatings prepared in this manner are subject to migration across the coatings of internal product moisture and external cooking oil. This causes undesirable surface oil and moisture saturation on reconstitution.

Another approach which has been suggested for producing a crisp, browned end product from batter coated frozen comestibles is described in U.S. Pat. No. 4,199,603. That patent describes the use of a single edible oil/starch/particulate coating which is applied to the frozen comestible prior to packaging. Unfortunately, when the frozen comestible is reconstituted, the edible oil fraction of the coating becomes fluid and, together with the internal moisture of the comestible, causes the coating to soften significantly, producing an undesirable reconstituted product.

SUMMARY OF THE INVENTION

It is an object of the present invention to provide a frozen comestible with a batter and/or breaded coating which, when reconstituted by microwave heating or by baking in a conventional oven, will have a texture and appearance organoleptically equivalent to or superior to that of fat-fried comestibles.

It is a further object of the present invention to provide a frozen comestible with a batter and/or breaded coating which exhibits improved storage stability.

It is another object of the present invention to provide a batter coated and/or breaded frozen comestible which can be reconstituted as a crisp, organoleptically desirable product by microwave heating, without using specially manufactured microwaveable cookware.

A further object of the present invention is to provide a double coating and frying method for comestibles in which, on reconstitution of the comestibles, the first coating controls the migration of incipient moisture and oil to enable the desired crispiness to be imparted to the second coating.

A still further object of the present invention is to provide a coated, frozen comestible produced by the unique process of the present invention.

Other objects and advantages of the present invention will appear hereinafter.

The present invention is directed to a process for preparing coated, frozen comestibles by enrobing comestibles with a first batter, subjecting the coated comestibles to heating in a water bath, frying, coating the comestible with a second batter, optionally applying a breading, frying again and then freezing the resulting product. This process seals moisture within the coated comestible to a degree hitherto not achieved in the art, enabling the product to be stored for extended periods and to retain its surface crispiness and other desirable organoleptic qualities during microwave or conventional oven reconstitution, as well as during reconstitution by frying.

DESCRIPTION OF THE PREFERRED EMBODIMENTS

The present invention finds application with any comestible that can be coated with a batter and/or breading, including poultry, fish, red meats, (eg. beef, pork and lamb), egg products, vegetables, and fabricated foods.

"Egg products", for these purposes, are any foods derived from eggs of the domestic hen, broken from the shells and then used whole, separated into yolks or whites, dried or frozen. "Fabricated foods" are foods prepared from novel combinations of dietary ingredients and/or processing technology which are covered under the provisions of the Code of Federal Regulations, Food and Drugs, Title 21, §102.5 Examples of fabricated foods include restructured meats and seafoods, and meat/vegetable/egg based patties.

The principal focus of the examples which follow the discussion below will be on chicken, seafood and fabricated foods and on reconstitution by microwave heating. Nevertheless, it is stressed that the invention is applicable not only to these comestibles, but also to poultry of various types and forms as well as to the other above identified comestibles, and to reconstitution by baking in a conventional oven, or by frying.

The process of the present invention includes a dual flour-based coating procedure. The flour can be a malted or unmalted red or white, spring or winter wheat flour exhibiting a wide range of gluten strengths along with a similar range of protein and farinograph water absorption values. Such flours may optionally also be bleached, bromated, and/or aged. These flours can include spring wheat, high gluten spring wheat, and straight grade wheat flour. Within these categories, the malted form of the flour is less preferred because it produces a less crispy product. Also, it is noted that the identified types of flours can be used singly or in combination.

The preferred wheat flours used in the first coating will have the following characteristics (percentages are by weight):

| Flour Characteristics | Preferred | Most Preferred |
|---|---|---|
| Protein (N × 5.7, 14% moisture basis) | 9–14% | 11–13% |
| Ash (14% moisture basis) | 0.40–0.55% | 0.45–0.50% |
| Water absorption (Brabender Farinograph, American Association of Cereal Chemists Method 54-21) | 56–65% | 60–63% |

The shortening used in preparing the first coating can be a plastic, flake, or powdered shortening, from vegetable and/or animal sources. Plastic shortenings are mixtures of liquid and crystalline triglycerides in which the liquid oil is enmeshed in a mass of minute fat crystals that represent separate and discrete particles. Flaked shortenings are derived from this product and possess higher Wiley melting points and Solid Fat Index profiles. Shortening powders are processed from the same oils cited above and further contain other processing aids such as sugars, caseinates, phosphates, antioxidants and free-flowing agents.

Typical, conventionally available shortenings which, in accordance with the method of the present invention achieve a tenderized coating of the desired crispiness without excessive toughness or brittleness, include blends of partially hydrogenated soybean, cottonseed, coconut, and/or palm oils of the following specifications:

| Characteristics | Preferred | Most Preferred |
|---|---|---|
| AOM Stability, hours | 70–200 | 100–200 |
| Wiley Melting Point, °C. | 32–60 | 38–54 |
| Solid Fat Index (SFI) | | |
| @ 10° C. | 20–70 | 30–60 |
| @ 21° C. | 15–70 | 20–60 |
| @ 33° C. | 10–40 | 15–25 |
| @ 38° C. | 0–40 | 10–20 |

In one embodiment, dried egg white may be added to the first coating to improve the crispiness of the coated comestible after reconstitution.

The first coating is prepared by blending the flour, the vegetable shortening and, when used, the dried egg whites, with sufficient water to yield a batter of the desired consistency.

The first coating will comprise a dry batter mixture of about 60 to 95 parts by weight of flour per 100 parts of the mixture and about 5 to 40 parts by weight of shortening per 100 parts of the mixture hydrated with about 32 to 200 parts by weight of water per 100 parts of the dry batter mixture. Preferably, the flour will be present at about 60 to 85 parts by weight per 100 parts of the mixture, the shortening will be present at about 15 to 40 parts by weight per 100 parts of the mixture, and the water will be present at about 32 to 125 parts by weight per 100 parts of the dry batter mixture. When dried egg whites are used, a range of from about 85 to 95 parts of weight of flour is combined with a range of from about 5 to 15 parts by weight of dried egg whites per 100 parts of the flour-dried egg white batter mixture. With such use, the water hydration range would be expanded to from about 25 to 200 parts by weight of water per 100 parts of dry batter mixture.

The consistency of the batter must be determined on a case-by-case basis, depending on the nature of the comestibles being coated and the coating system intended to be used. For example, a batter of lower water content ("dough") can be sheeted, wrapped around a comestible portion, and cut to form a complete seal. Alternatively, a batter with higher water content can be applied by dipping or spraying onto the comestible portion.

Preferably, the comestible will be tempered or held under specified refrigeration temperatures (generally about −4° to 0° C.) to stabilize its surface texture and moisture content prior to application of the batter. Also, in all cases the adhesion of the first coating can be maximized by optionally predipping the comestible in an adhesion agent such as an aqueous suspension of egg white or commercially modified corn or wheat adhesion starches at a solids range of 20–30%.

After the comestible is enrobed with the first coating, it is boiled in a water bath maintained at from about 100° to 125° C. over a pressure range of from 0 to 15 pounds per square inch (psi) for a maximum time of about 60 seconds. In a preferred embodiment, the bath is maintained at 100° C. at atmospheric pressure (0 psi) and the comestible is kept in the bath for about 60 seconds.

Following boiling, the comestible is immediately fried for about 30 seconds to 2 minutes at a temperature preferably in the range of about 177°–216° C. and most preferably in the range of about 193°–204° C. The cooking time is selected to properly set up the first coating without making the coating doughy and pasty (undercooked) or burned, hard, dried-out and leathery (overcooked).

Any general purpose animal or vegetable fat capable of being heated to and retaining its stability in the desired temperature range can be used in this frying step, as long as the comestible is completely submerged in the fat to assure even and complete cooking. Optionally, docking holes can be made in the coating before frying, in order to minimize separation of the coating from the surface of the comestible due to steam release during frying.

The second coating may be applied to the once-coated/boiled/fried comestible immediately after the completion of the frying step or this application may be delayed. There is no need to cool before recoating.

The second coating may be a chemically leavened batter or a combination of a batter (chemically leavened and/or unleavened) with a supplemental breading. A chemically leavened batter comprises any combination of cereal flours and salt, along with a bicarbonate salt and an acid reactant which combine momentarily to produce carbon dioxide gas to yield the crisp, porous coating typically associated with leavened systems. Development of optimum texture is not dependent upon an added breading. By contrast, an unleavened batter is composed of the cereal flours and salt and/or processed starches, gums, and egg and dairy products, and serves primarily as an adhesion layer between the coated comestible and the supplemental breading.

Optional ingredients may be added to this second coating to impart the desired coloring and flavoring, such as corn sugar, whey, milk/egg powders, spices, powdered lemon juice, etc. Those familiar with the art will be able to readily determine the levels and types of optional ingredients necessary or desirable for the particular comestible being coated.

The single coated, water-bath treated, once-fried portions are dipped into the second batter followed by optional application of a breading, if desired.

This breading may, for example, be formed of low density Japanese-style crumbs which are characterized by an elongate shape and a splintered appearance, such as those described in the present assignee's U.S. Pat. No. 4,423,078.

The breading may contain small quantities of components to impart color to the reconstituted comestible and/or to affect the browning rate upon reconstitution. For example, caramel coloring or dextrose may be present. The optimum particle size and browning rates of these breadings are based on the comestible to be coated and the overall appearance desired.

After application of the second batter and/or breading, the twice-coated comestibles are fried a second time. The second frying step is preferably conducted for about 20 to 60 seconds at about 193°–216° C. Typically, this frying time would not be decreased below about 20 seconds since this would require a higher frying temperature to achieve complete cooking. This could increase the rate of breakdown of the frying fat to an unacceptable level. However, the frying time could be increased to as long as 2 minutes if the corresponding temperature were reduced to about 177° C. As in the first frying step, it is important that the product be completely submerged during frying to insure complete cooking.

After the second frying step, the comestible is rapidly frozen, preferably to at least −5° C. and most preferably to at least −30° C.

The resulting product may be stored for extended periods. When it is desired to reconstitute the portions, they may be heated in a microwave oven directly from the frozen state. The actual cooking time will depend upon the temperature desired in the finished product as well as the power available in the microwave oven.

It is an important feature of the present invention that the special ceramic dishes typically required in microwave cooking to obtain browning can but need not be used with the frozen comestible products of the present process. For example, the present product can be heated on absorbent tissue. Preferably, however, the present product will be heated on absorbent fiberboard heating trays that are commercially available for microwave use. Such absorbent trays are designed to maximize uniform microwave transmission and to remove residual surface oil and moisture from the coated products.

The following examples are intended to illustrate the practice of the present invention. These examples are not intended to be exhaustive or limiting of the invention.

EXAMPLE 1

Uncooked chicken portions were fabricated from selected ratios of white and dark meat, ground and formed into 0.5 oz. sections. The portions were irregularly shaped disks having a diameter of 1–2 inches and a thickness of ¼ inch.

The uncooked, frozen chicken portions were tempered with a cold water rinse to remove surface ice crystals and then enrobed with a first coating in accordance with the present invention. The first coating was prepared by combining straight grade hard wheat flour with a plastic shortening. The hard wheat flour utilized in this example had the following characteristics (percentages are by weight):

| | |
|---|---|
| Protein (N × 5.7, 14% moisture basis) | 11–12% |
| Ash (14% moisture basis) | 0.40–0.50% |
| Minimum Water Absorption (Brabender Farinograph American Association of Cereal Chemists Method 54-21) | 60% |

The plastic shortening utilized was a blend of partially hydrogenated soybean, cottonseed and palm oils with the following characteristics:

| | |
|---|---|
| AOM Stability, hours | 200 |
| Wiley Melting Point, °C. | 38–43 |
| Solid Fat Index (SFI) | |
| @ 10° C. | 50–55 |
| @ 21° C. | 36–40 |
| @ 33° C. | 12–17 |
| @ 38° C. | 4–6 |

This first coating was prepared by adding 1.0 parts of flour 0.4 parts of the plastic vegetable shortening and then hydrating with water in a range of 0.67 parts by weight to a maximum of 1.3 parts by weight, expressed in terms of the flour weight. The shortening was blended with the flour in a laboratory scale version of a large vertical paddle mixer of the type normally used to make dough or batter on a production scale.

The initial flour/shortening blending was done on the slowest speed until shortening particles were ¼ inch in diameter or smaller.

Sufficient water was added to this material to yield a dough. Subsequent blending was done at an intermediate speed setting until a homogeneous dough was obtained.

The dough was sheeted to a 1/16 inch thickness and wrapped around the tempered chicken portions. The edges were pinched and cut to form a complete seal and docking holes were made in the surface of the sheeting with the tips of a fork.

After the first coating was applied, the product was gently stirred in boiling water at 100° C. for one minute and then fried for 1 to 2 minutes at a temperature in the range of 193°-200° C. by completely submerging the portions in a restaurant-style fryer containing the above described plastic shortening. This once fried product was weighed to determine the extent of the coating pick-up expressed as:

$$\frac{\text{final weight} - \text{raw weight}}{\text{final weight}} \times 100$$

It was found that the coating pick-up averaged between 15 and 20%.

After the first frying step, a second coating was applied by dipping the product in a prepared batter comprising:

| Ingredient | Percent By Weight |
| --- | --- |
| Yellow Corn Flour | 60.0 |
| Straight Grade Hard Wheat Flour | 32.0 |
| Sodium Bicarbonate, USP Powder | 1.5 |
| Sodium aluminum phosphate, acidic | 1.5 |
| Salt | 5.0 |

The yellow corn flour was a commercially available product having a cold water viscosity of about 80-250 centipoises when hydrated at one part of flour to two parts of water (determined on a Brookfield LVT viscometer using a #2 spindle while mixing for 30 seconds at a speed of 30 rpm). This batter was hydrated at one part to 1.6 parts of water, mixed until smooth and held for 10 minutes prior to use.

The dipped product was fried a second time for about 45-60 seconds at about 193°-200° C. Again, the product was weighed to determine the total pick-up, this time from the two coatings. It was found that the pick-up averaged a maximum of 40%. The twice coated portions were then frozen in metal trays at −30° C.

Finally, the frozen, coated portions were placed on vented, absorbent fiberboard trays possessing a raised gridboard bottom surface and microwave heated from the frozen state to a minimum internal temperature of 60° C. alternatively in a consumer (650 watt) and a commercial (1400 watt) microwave oven, respectively for 2 to 5 and 1 minute. The resulting product was organoleptically superior to that of fat-fried coated chicken portions, possessing superior appearance, texture and flavor.

EXAMPLE 2

In this example, the effect of the water bath treatment on freeze-thaw stability of chicken prepared in accordance with Example 1 was examined.

The following method was designed to simulate the effect of freeze-thaw cycling that might be encountered on extended storage of frozen comestibles:

a. Samples in closed containers are placed in storage at −18° C. for at least two days prior to initiating the freeze-thaw testing.

b. The products are removed from the freezer and thawed at room temperature (25±2° C.) and then frozen again. This cycle of successive freezing and thawing is repeated four times over a period of 48 hours, whereupon the product is refrozen, removed from storage, and reconstituted in a microwave oven to a minimum internal temperature of 60° C.

Samples prepared with and without the water bath treatment were subjected to freeze-thaw testing according to the above method. The comestibles which were not subjected to the boiling step were objectionably chewy and doughy. The comestibles which were subjected to the boiling step, on the other hand, possessed a lighter bite and had perceptibly improved crispiness.

While the present invention is described above in connection with preferred or illustrative embodiments, these embodiments are not intended to be exhaustive or limiting of the invention. Rather, the invention is intended to cover all alternatives, modificatiions, and equivalents included within its spirit and scope, as defined by the appended claims.

What is claimed is:

1. A method for preparing storage stable, coated frozen comestibles which, when reconstituted by microwave cooking or by baking, have a texture and appearance organoleptically equivalent or superior to that of fat fried coated comestibles, comprising the steps of:

enrobing a comestible with a first coating comprising wheat flour and shortening blended with sufficient water to yield a batter or a dough of a consistency suitable for enrobing the comestible, and placing the enrobed comestible in a water bath maintained at from about 100° to 125° C. at a pressure range of about 0 to 15 psi for up to about 60 seconds;

frying said comestible to set up said first coating without undercooking or overcooking said first coating;

applying to said comestible a second coating chosen from the group consisting of a chemically leavened batter and a combination of a batter and a supplemental breading capable of yielding a crisp, porous coating upon reconstitution and frying a second time; and freezing the twice coated, twice fried product.

2. The method of claim 1 wherein said water bath is maintained at a temperature of about 100° C. at atmospheric pressure.

3. The method of claim 1 wherein said first coating includes dried egg white.

4. The method of claim 1 wherein said wheat flour has the following characteristics, in percentages by weight:

| Protein (N × 5.7, 14% moisture basis) | 9–14% |
| --- | --- |
| Ash (14% moisture basis) | 0.40–0.55% |
| Water absorption (Brabender Farinograph, American Association of Cereal Chemists Method 54-21) | 56–65%. |

5. The method of claim 1 wherein said wheat flour has the following characteristics, in percentages by weight:

| Protein (N × 5.7, 14% moisture basis) | 11–13% |
| --- | --- |
| Ash (14% moisture basis) | 0.45–0.50% |
| Water absorption (Brabender Farinograph, American Association of Cereal Chemists Method 54-21) | 60–63%. |

6. The method of claim 1 wherein said shortening is chosen from the group consisting of plastic, flake, and powdered shortenings.

7. The method of claim 1 wherein, before applying said first coating, said comestible is dipped in an adhesion agent chosen from the group consisting of aqueous suspensions of egg whites, modified corn and wheat adhesion starches.

8. The method of claim 1 wherein said first coating is a dough which is sheeted, wrapped around the comestible, and cut to form a complete seal.

9. The method of claim 1 wherein said first coating is a batter applied to the comestible by spraying or dipping.

10. The method of claim 1 wherein, before enrobing said comestible with said first coating, said comestible is tempered.

11. The method of claim 1 wherein said comestible is chosen from the group consisting of poultry, fish, red meats, egg products, vegetables, and fabricated foods.

12. The method of claim 1 wherein: said first coating comprises a dry batter mixture of about 60 to 95 parts by weight of flour per 100 parts of said dry batter mixture and about 5 to 40 parts by weight of shortening per 100 parts of said dry batter mixture hydrated with about 32 to 200 parts by weight of water per 100 parts of said dry batter mixture.

13. The method of claim 1 wherein: said first coating comprises a dry batter mixture of about 60 to 85 parts by weight of flour per 100 parts of said dry batter mixture and about 15 to 40 parts by weight of shortening per 100 parts of said dry batter mixture hydrated with about 32 to 125 parts by weight of water per 100 parts of said dry batter mixture.

14. The method of claim 1 wherein: said first coating comprises a dry batter mixture of about 85 to 95 parts by weight of flour per 100 parts of said dry mixture, about 5 to 15 parts by weight of dried egg whites per 100 parts of said dry batter mixture and about 5 to 40 parts by weight of shortening per 100 parts of said dry batter mixture hydrated with about 25 to 200 parts by weight of water per 100 parts of said dry batter mixture.

15. The method of claim 1 wherein said first coating is fried from about 30 seconds to 2 minutes at a temperature of about 177° to 216° C.

16. The method of claim 1 wherein second coating is fried from about 20 to 60 seconds at a temperature of about 193° to 216° C. and said comestible is then frozen to at least −5° C.

17. A method for preparing storage stable coated frozen comestibles which, when reconstituted by microwave cooking or by baking, have a texture and appearance organoleptically equivalent or superior to that of fat fried coated comestibles, comprising the steps of:

enrobing a comestible with a first coating batter or dough comprising shortening, water and wheat flour, said wheat flour having the following characteristics, in percentages by weight:

| | |
|---|---|
| Protein (N × 5.7, 14% moisture basis) | 9-14% |
| Ash (14% moisture basis) | 0.40-0.55% |
| Water absorption (Brabender Faringograph, American Association of Cereal Chemists Method 54-21) | 56-65%; | placing the enrobed comestible in a water bath maintained at from about 100° to 125° C. at a pressure range of about 0 to 15 psi for up to about 60 seconds;

immediately frying said comestible for about 30 seconds to 2 minutes at a temperature of about 177° to 216° C.;

applying to said comestible a second coating chosen from the group consisting of chemically leavened batters and combinations of a batter and a supplemental breading;

frying a second time; and, freezing the twice coated, twice fried product.

18. The method of claim 17 in which said comestible is chosen from the group consisting of poultry, fish, red meats, egg products, vegetables, and fabricated foods.

* * * * *